United States Patent
Aoki et al.

(10) Patent No.: US 6,787,103 B2
(45) Date of Patent: Sep. 7, 2004

(54) HYDROGEN STORAGE ALLOY HAVING LAVES PHASE AND PRODUCTION METHOD THEREFOR

(75) Inventors: Yasuhiro Aoki, Hokkaido (JP); Takaaki Miyaki, Hokkaido (JP)

(73) Assignee: Japan Steel Works Ltd., Tokyo (JP)

( * ) Notice: Subject to any disclaimer, the term of this patent is extended or adjusted under 35 U.S.C. 154(b) by 214 days.

(21) Appl. No.: 10/012,497

(22) Filed: Dec. 12, 2001

(65) Prior Publication Data

US 2002/0046788 A1 Apr. 25, 2002

(51) Int. Cl.⁷ ............................................. C22C 30/00
(52) U.S. Cl. ..................... 420/581; 420/900; 148/538
(58) Field of Search .............................. 420/581, 900; 148/538, 540, 548

(56) References Cited

U.S. PATENT DOCUMENTS

| | | | | |
|---|---|---|---|---|
| 4,946,646 A | * | 8/1990 | Gamo et al. | 420/415 |
| 5,281,390 A | * | 1/1994 | Gamo et al. | 420/422 |
| 5,490,970 A | * | 2/1996 | Gamo et al. | 420/424 |
| 5,552,246 A | * | 9/1996 | Hong | 429/218 |
| 5,695,530 A | * | 12/1997 | Hong et al. | 29/623.1 |
| 6,626,323 B2 | * | 9/2003 | Stetson et al. | 220/577 |

FOREIGN PATENT DOCUMENTS

| | | |
|---|---|---|
| DE | 199 16 614 A1 | 12/1999 |
| DE | 101 08 654 A1 | 9/2001 |
| JP | 2-10659 | 1/1990 |

OTHER PUBLICATIONS

Japanese Patent Abstract No. 02010659, dated Jan. 16, 1990.

* cited by examiner

*Primary Examiner*—Daniel Jenkins
(74) *Attorney, Agent, or Firm*—Sughrue Mion, PLLC

(57) ABSTRACT

The present invention is to obtain a Ti—Zn—Mn—V—Fe based hydrogen storage alloy having the excellent hydrogen absorbing and discharging performance at a low cost. An alloy represented by the general formula: $Ti_{1-x}Zr_x Mn_{w-y-z}V_yFe_z$ (wherein $0 \leq x \leq 0.5$, $0 < y \leq 0.6$, $0 < z \leq 0.2$, and $1.8 \leq w \leq 2.2$) is produced using a ferrovanadium (alloy of a V and an Fe) as one of the raw materials. The oxygen content of the alloy is limited to 5,000 ppm or less. A hydrogen storage alloy having the excellent hydrogen absorbing and discharging performance can be produced using an inexpensive ferrovanadium. Furthermore, an impurity oxygen, which adversely effect the performance, can be limited easily.

18 Claims, No Drawings

HYDROGEN STORAGE ALLOY HAVING LAVES PHASE AND PRODUCTION METHOD THEREFOR

CROSS REFERENCE TO RELATED APPLICATION

The present invention is based on Japanese Patent Application No. 2000-217187, which is incorporated herein by reference.

BACKGROUND OF THE INVENTION

1. Field of the Invention

The present invention relates to a hydrogen storage alloy having a Laves phase containing vanadium.

2. Description of Related Art

Recently, hydrogen energy is focused as a new energy, and development of the hydrogen storage alloy reversibly absorbing and discharging hydrogen, is promoted elaborately in various fields, such as the hydrogen storage, heat pumps, actuators, and electrodes for secondary batteries. Among the hydrogen storage alloys, a Ti—Zr—Mn—V based hydrogen storage alloy has a large rechargeable hydrogen capacity, and the excellent alloy performance.

Conventionally, in order to obtain the alloy, a method of utilizing metals of elemental substances as the raw materials is applied, adjusting the component thereof at the time of melting, and providing the raw material melted mainly by the Ar arc melting method or the high frequency induction melting method into a dye. Moreover, after forming the alloy, a high temperature heat treatment is executed for a long time in order to improve the alloy performance.

In the above-mentioned Ti—Zr—Mn—V based hydrogen storage alloy, the oxygen content of the raw materials, in particular, of the vanadium drastically influences the hydrogen absorbing and discharging performance. In the case the content is large, the hydrogen absorbing amount of the alloy is deteriorated. However, since a vanadium has ordinarily a relatively large oxygen content of 10,000 ppm or more, a desired performance cannot be obtained in the case that the vanadium is directly used as the raw material for the hydrogen storage alloy. Therefore an oxygen reduction treatment is required. As a result, the alloy production cost is increased and a problem is caused that realization of a system containing the alloy is disturbed.

Moreover, the heat treatment to be performed after forming the alloy also increases the production cost and the production time, Furthermore, it may lead to oxidization of the alloy so as to deteriorate the performance, and thus a problem of difficulty in handling is also involved.

SUMMARY OF THE INVENTION

In view of the circumstances, an object of the invention is to provide a Ti—Zr—Mn—V—Fe hydrogen storage alloy with the excellent hydrogen absorbing and discharging performance by optimizing the components. Another object thereof is to provide a production method for a hydrogen storage alloy capable of producing the alloy efficiently at a low cost.

In order to solve the problems, a first aspect of the invention is a hydrogen storage alloy having Laves phase represented by the general formula: $Ti_{1-x}Zr_xMn_{w-y-z}V_yFe_z$, wherein $0 \leq x \leq 0.5$, $0 < y \leq 0.6$, $0 < z \leq 0.2$, and $1.8 \leq w \leq 2.2$.

A second aspect of the invention is the hydrogen storage alloy having a Laves phase according to the first aspect, wherein the content of the oxygen is 5,000 ppm or less.

A third aspect of the invention is a production method for a hydrogen storage alloy having a Laves phase, wherein the hydrogen storage alloy according to the first or second aspect is formed by using a ferrovanadium (alloy of a vanadium and an iron) as one of the raw materials.

A fourth aspect of the invention is the production method for a hydrogen storage alloy having a Laves phase according to the third aspect, wherein the oxygen content of the ferrovanadium is 4,000 ppm or less.

A fifth aspect of the invention is the production method for a hydrogen storage alloy having a Laves phase according to the third or fourth aspect, wherein the melted raw materials are rapidly quenched and solidified.

Hereinafter, the atomic ratio defined in the invention, or the like, will be explained.

Atomic Ratio of the Alloy

Ti: Atomic Ratio 0.5 to 1.0

Since the titanium is an element capable of increasing the hydrogen absorbing amount, it is added as an essential component. However, in order to certainly obtain the above-mentioned effect, the atomic ratio should be 0.5 or more. In contrast, in the case it is added by more than a 1.0 amount, the hydrogen dissociation pressure is lowered. Therefore, the atomic ratio is set in the range of 0.5 to 1.0.

Zr: Atomic Ratio 0.5 or Less

Since the zirconium is an element capable of adjusting the hydrogen equilibrium dissociation pressure, it is optionally added. However, in the case it is added by a more than 0.5 atomic ratio, the hydrogen equilibrium dissociation pressure is lowered. Therefore, the upper limit of the atomic ratio is set at 0.5.

Mn: Atomic Ratio 1.0 to Less than 2.2

Since the manganese is an element capable of lowering the hydrogenation reaction temperature, it is added as an essential component. However, in order to certainly obtain the above-mentioned effect, the atomic ratio should be 1.0 or more. In contrast, in the case it is added by a 2.2 or more amount, the hysteresis is enlarged. Therefore, the atomic ratio is set in the range of 1.0 to less than 2.2.

V: Atomic Ratio 0.6 or Less

Since the vanadium is an element capable of increasing the hydrogen absorbing amount, it is added as an essential component. However, in the case it is added by a more than 0.6 atomic ratio, the reaction rate is lowered. Therefore, the upper limit of the atomic ratio is set at 0.6.

Fe: Atomic Ratio 0.2 or Less

Since the iron is an element contained at the time of using a ferrovanadium, it is added as an essential component. However, in the case it is added by a more than 0.2 atomic ratio, the hydrogen equilibrium dissociation pressure is raised. Therefore, the upper limit of the atomic ratio is set at 0.2.

Impurity Oxygen: 5,000 ppm or Less

The impurity oxygen contained in a hydrogen storage alloy influences the hydrogen absorbing and discharging ability. In the case the amount thereof is large, the absorbing and discharging ability is deteriorated. Therefore, the contained oxygen amount is preferably as little as possible. In consideration of the industrial applicability, the content thereof is preferably 5,000 ppm or less, and further preferably 1,000 ppm or less.

Laves Phase

Since a hydrogen storage alloy according to the invention has a Laves phase structure, it provides a high hydrogen absorbing effect owing to the Laves structure.

Use of Ferrovanadium

Since the alloy of the invention provides a good hydrogen absorbing and discharging performance owing to an appropriate component adjustment (including the iron), the ferrovanadium can be used as the raw material. Since the ferrovanadium is produced at a low cost compared with the case of a vanadium single metal, a desired hydrogen storage alloy can be produced efficiently at a low cost. As the ferrovanadium, for example, those containing a vanadium by 80 to 85% mass ratio, and an iron as the substantially remainder, can be presented. Furthermore, it is desirable that the ferrovanadium has the oxygen included as the impurity, limited to 4,000 ppm or less. More preferably, the ferrovanadium may contain the oxygen not more than 3,000 ppm. According to the limitation of the oxygen content, the oxygen content of a hydrogen storage alloy prepared with the ferrovanadium as the raw material can be sufficiently lowered so that the averse effect to the hydrogen absorbing and discharging performance can be eliminated.

Rapid Solidification

Furthermore, in the production of a hydrogen storage alloy according to the invention, the raw materials with the components adjusted, are melted, and rapidly quenched and solidified for preparation.

By preparing the hydrogen storage alloy by quenching and solidifying, by for example, roll quenching, the plateau properties and the hysteresis properties can be improved dramatically so that the storage and transportation efficiency of the hydrogen can be improved. In the conventional production method, the cooling operation at the time of forming an alloy is carried out by natural cooling or water cooling. In contrast, in the invention, the above-mentioned effect can be formed by quenching and solidifying at a cooling rate higher than that of the conventional method. As to the cooling rate, a cooling rate of 100° C./second or more can be presented, and furthermore, a cooling rate of $10^{3°}$ C./second or more can be presented as a preferable embodiment.

Particularly in the case of adding a zirconium, segregation of the zirconium in the alloy can be prevented so that a problem of increase of the plateau slope due to the zirconium segregation can be solved.

The above-mentioned method for rapid solidification is not particularly limited, and various methods capable of obtaining the cooling rate can be adopted. For example, the gas atomize method, the centrifugal method, the rotation submerged jetting method, the roll quenching method, or the like, can be adopted.

DETAILED DESCRIPTION OF THE PREFERRED EMBODIMENT

In the invention, a hydrogen storage alloy is obtained preferably by measuring each of the Ti, Zr, Mn, Fe—V component materials so as to have the atomic ratio defined in the invention, melting the same by an ordinary method, and rapid solidification by the roll quenching method, or the like, as mentioned above.

Although a homogenization process of heating the alloy at a high temperature for homogenizing the components is applied in the conventional method after preparing a hydrogen storage alloy, in the invention, a sufficient homogenization effect is obtained by the above-mentioned rapid solidification so that a final alloy can be provided without the need of the homogenization process, which is executed in the conventional method. The final alloy denotes an alloy in the state to be used for the targeted application without the need of a heat treatment, or the like.

The obtained hydrogen storage alloy is pulverized as needed by a mechanical method, or the like so as to provide a powdery hydrogen storage alloy. The pulverization method is not particularly limited, and an optional method such as a known method can be adopted.

The hydrogen storage alloy in the powdery form can be used for a desired application as it is or after shaping. The application of the hydrogen storage alloy obtained by the invention is not particularly limited, and it can be used for various applications utilizing the hydrogen absorbing and discharging phenomenon. For example, it can be used in a heat pump of a heat transportation system or a freezing system, a hydrogen storage system, or the like. By use of the hydrogen storage alloy obtained by the invention in these systems, the system efficiency can be improved dramatically.

EXAMPLES

Hereinafter, the example of the invention will be explained in comparison with the comparative examples.

Embodiment

In order to obtain the alloy composition $Ti_{0.7}Zr_{0.3}Mn_{1.4}V_{0.5}Fe_{0.1}$, the elemental substances of Ti, Zr, and Mn and a ferrovanadium (V: about 85% by mass, Fe: about 15% by mass, and O: about 0.3% by mass) were used as the raw materials. A hydrogen storage alloy was formed by melting the raw materials by the Ar arc melting, and quenching and solidifying the same by a single roll (average cooling rate $10^{4°}$ C./second).

According to the hydrogen pressure-composition-isothermal curve measurement (PCT curve measurement) and the component analysis of the alloy, it was found out that the rechargeable hydrogen capacity at 40° C. was about a little less than 100 cc/g, and the contained oxygen amount in the alloy was 0.146% by mass. The alloy raw material cost of the production of the hydrogen storage alloy was reduced by about 90% compared with the case of using the metal vanadium. Furthermore, it was learned that the excellent hydrogen absorbing and discharging performance can be provided.

Comparative Example 1

In order to obtain the alloy composition $Ti_{0.7}Zr_{0.3}Mn_{1.4}V_{0.5}Fe_{0.1}$, the elemental substances were used for all of the components. A hydrogen storage alloy was formed by melting the raw materials by the Ar arc melting, and quenching and solidifying the same by a single roll. The contained oxygen amount of the V at the time was 14,000 ppm. According to the hydrogen pressure-composition-isothermal curve measurement and the component analysis of the alloy, it was found out that the rechargeable hydrogen capacity at 40° C. was about 100 cc/g, and the contained oxygen amount was 0.260% by mass. In the comparative example 1, the alloy production cost was soared drastically.

Comparative Example 2

In order to obtain the alloy composition $Ti_{0.7}Zr_{0.3}Mn_{1.4}V_{0.5}Fe_{0.1}$, the elemental substances were used for all of the components. A hydrogen storage alloy was formed by melting the raw materials by the Ar arc melting, and applying a heat treatment in the Ar atmosphere at 1,100° C. for 24 hours. According to the result of the hydrogen pressure-composition-isothermal curve measurement, it was confirmed that a sufficient rechargeable hydrogen capacity cannot be ensured due to a large inclination in the plateau slope and the low heat treatment temperature compared with the case of the alloy produced by the single roll quenching and solidifying method.

Comparative Example 3

In order to obtain the alloy composition $Ti_{0.7}Zr_{0.3}Mn_{1.4}V_{0.5}Fe_{0.1}$, the elemental substances of Ti, Zr, and Mn, and a ferrovanadium were used as the raw materials. Hydrogen storage alloys with 0.8% by mass and 0.3% by mass contained oxygen amounts were obtained by melting the raw materials by the high frequency induction melting, and quenching and solidifying the same by a single roll. According to the result of the hydrogen pressure-composition-isothermal curve measurement, it was observed that the alloy with the 0.8% by mass contained oxygen amount has an rechargeable hydrogen capacity at 40° C. smaller by about 10 cc/g, and a raised plateau pressure.

As heretofore explained, according to a hydrogen storage alloy having Laves phase of the invention, since it is represented by the general formula: $Ti_{1-x}Zr_xMn_{w-y-z}V_yFe_z$, (wherein $0 \leq x \leq 0.5$, $0 < y \leq 0.6$, $0 < z \leq 0.2$, and $1.8 \leq w \leq 2.2$), the excellent hydrogen absorbing and discharging performance can be obtained by appropriately setting the components. According to the component setting, a hydrogen storage alloy can be formed using a relatively inexpensive ferrovanadium.

Moreover, by setting the oxygen content of the ferrovanadium at not more than 4,000 ppm (preferably not more than 3,000 ppm), a hydrogen storage alloy with a small oxygen content can be formed from inexpensive materials so that a hydrogen storage alloy with the excellent hydrogen absorbing and discharging performance can be produced at a low cost.

What is claimed is:

1. A production method for a hydrogen storage alloy having a Laves phase represented by the general formula: $Ti_{1-x}Zr_xMn_{w-y-z}V_yFe_z$, wherein $0 \leq x \leq 0.5$, $0 < y \leq 0.6$, $0 < z \leq 0.2$, and $1.8 \leq w \leq 2.2$, comprising forming said hydrogen storage alloy by melting raw materials, wherein said raw materials comprise an alloy comprising a vanadium and an iron.

2. The production method for a hydrogen storage alloy having a Laves phase according to claim 1, wherein said alloy comprising a vanadium and an iron is a ferrovanadium and the oxygen content of the ferrovanadium is not more than 4,000 ppm.

3. The production method for a hydrogen storage alloy having Laves phase according to claim 1, wherein the melted raw materials are rapidly quenched and solidified.

4. The production method for a hydrogen storage alloy having a Laves phase according to claim 1, wherein a titanium, a zirconium, a manganese and a ferrovanadium are provided separately in said raw materials and said raw materials are melted by Ar arc melting and integrated into said hydrogen storage alloy.

5. The production method for a hydrogen storage alloy having a Laves phase according to claim 2, wherein the ferrovanadium includes 80 to 85% by mass ratio of vanadium and the remainder being substantially iron.

6. The production method for a hydrogen storage alloy having a Laves phase according to claim 3, wherein the melted material is rapidly quenched with cooling rate about $10^{4°}$ C./second.

7. A production method for a hydrogen storage ally having a Laves phase represented by the general formula: $Ti_{1-x}Zr_xMn_{w-y-z}V_yFe_z$, wherein $0 \leq x \leq 0.5$, $0 < y \leq 0.6$, $0 < z \leq 0.2$, and $1.8 \leq w \leq 2.2$, said production method comprising the steps of:

providing separately a titanium, a zirconium, and a manganese as raw materials;

providing a ferrovanadium as another raw material;

integrally melting the titanium, the zirconium, the manganese and the ferrovanadium;

quenching and solidifying the melted raw materials.

8. The production method for a hydrogen storage alloy having a Laves phase according to claim 7, wherein the oxygen content of the ferrovanadium is not more than 4,000 ppm.

9. The production method for a hydrogen storage alloy having a Laves phase according to claim 7, wherein the ferrovanadium includes 80 to 85% by mass ratio of vanadium and the remainder being substantially iron.

10. The production method for a hydrogen storage alloy having a Laves phase according to claim 7, wherein the melted material is rapidly quenched with cooling rate about $10^{4°}$ C./second.

11. The production method for a hydrogen storage alloy having a Laves phase according to claim 3, wherein said quenching is roll quenching.

12. The production method for a hydrogen storage alloy having a Laves phase according to claim 3, wherein the melted material is rapidly quenched at a cooling rate of $10^{3°}$ C./second or more.

13. The production method for a hydrogen storage alloy having a Laves phase according to claim 1, further comprising pulverizing the hydrogen storage alloy.

14. The production method for a hydrogen storage alloy having a Laves phase according to claim 2, wherein the oxygen content of the ferrovanadium is not more than 3,000 ppm.

15. The production method for a hydrogen storage alloy having a Laves phase according to claim 7, wherein said quenching is roll quenching.

16. The production method for a hydrogen storage alloy having a Laves phase according to claim 7, wherein the melted material is rapidly quenched at a cooling rate of $10^{3°}$ C./second or more.

17. The production method for a hydrogen storage alloy having a Laves phase according to claim 7, further comprising pulverizing the hydrogen storage alloy.

18. The production method for a hydrogen storage alloy having a Laves phase according to claim 7, wherein the oxygen content of the ferrovanadium is not more than 3,000 ppm.

* * * * *